(12) United States Patent
Pacifico et al.

(10) Patent No.: US 6,704,402 B1
(45) Date of Patent: Mar. 9, 2004

(54) METHOD AND SYSTEM FOR A MULTIPLE LINE LONG DISTANCE DISCOUNT FEATURE

(75) Inventors: Mike Pacifico, Duluth, GA (US); Ray Rauba, Roswell, GA (US)

(73) Assignee: BellSouth Intellectual Property, Wilmington, DE (US)

( * ) Notice: Subject to any disclaimer, the term of this patent is extended or adjusted under 35 U.S.C. 154(b) by 0 days.

(21) Appl. No.: 09/966,348

(22) Filed: Sep. 28, 2001

(51) Int. Cl.[7] .............................................. H04M 15/00
(52) U.S. Cl. ......................... 379/114.02; 379/114.01; 379/114.03; 379/114.12; 379/114.1; 379/115.02; 455/406
(58) Field of Search ................... 379/112.01, 114.01, 379/114.1, 114.12, 112.07, 114.03, 114.05, 114.28, 115.01, 115.02, 121.02, 121.03, 121.05, 127.04; 455/405, 406, 407, 408

(56) References Cited

U.S. PATENT DOCUMENTS

| | | | | |
|---|---|---|---|---|
| 5,793,852 A | * | 8/1998 | Kang et al. ............. | 379/115.01 |
| 5,915,006 A | * | 6/1999 | Jagadish et al. ........ | 379/115.01 |
| 5,987,107 A | * | 11/1999 | Brown .................. | 379/114.12 |
| 5,991,376 A | * | 11/1999 | Hennessey et al. ...... | 379/114.1 |
| 6,052,447 A | * | 4/2000 | Golden et al. ........... | 379/114.1 |
| 6,173,046 B1 | * | 1/2001 | Jagadish et al. ............. | 379/111 |
| 6,298,125 B1 | * | 10/2001 | Goldberg et al. ........ | 379/114.1 |
| 6,337,901 B1 | * | 1/2002 | Rome et al. ........... | 379/112.01 |
| 2002/0151321 A1 | * | 10/2002 | Winchell et al. ............ | 455/406 |

* cited by examiner

Primary Examiner—Duc Nguyen
Assistant Examiner—Quoc D Tran
(74) Attorney, Agent, or Firm—Merchant & Gould

(57) ABSTRACT

A method and system for providing a multiple line long distance discount feature is disclosed. Call detail records for calls on a per call basis both in the wireline local and long distance setting and any wireless setting are assembled at a telecommunications service provider billing system for preparation of periodic billing to a subscriber. A discount feature engine reviews a periodic billing record for a billing telephone number and calculates the long distance charges for each telephone line associated with the billing telephone number. The line with the highest long distance charges is removed from consideration. The long distance charges for one or more of the remaining telephone lines is reduced by a predetermined amount. The reduced long distance charges are saved in a new periodic billing record associated with the billing telephone number. Thus, an incentive is provided for a customer to maintain his long distance service for more than one of his telephone lines with a single service provider because he will receive an incremental discount for at least one of his lines if he does so.

19 Claims, 3 Drawing Sheets

METHOD AND SYSTEM FOR A MULTIPLE LINE LONG DISTANCE DISCOUNT FEATURE

FIELD OF THE INVENTION

This invention relates generally to telecommunications, and more particularly relates to a method and system for providing a multiple line long distance discount feature.

BACKGROUND OF THE INVENTION

A wide range of telecommunication services including local area and long distance wireline and a variety of wireless telephone services are increasingly available and are being utilized by a wide range of telephone service subscribers for work, education, recreation, and the like. In order to remain competitive, providers of telecommunications services offer a number of calling plans designed to allow subscribers to make the most efficient use of telecommunications services. For example, a telecommunications service provider may offer a calling plan that dramatically reduces the rates charged for long distance wireline telecommunications services if the subscriber makes all calls on the weekends or on weekdays after 5:00 PM.

Telecommunications service providers offer all different types of calling plans and discounts to influence customers to switch their long distance service. Telecommunications service providers will sometimes undercut each other with these plans to obtain a customer's business, particularly a customer with multiple phone lines (because of the possibility of multiple long distance calls and increased charges). Thus, loyal customers, particularly customers with multiple lines in an account, are difficult for a telecommunications service provider to maintain. There is a need for an incentive for loyal customers with multiple phone lines to maintain their service with their existing telecommunications service provider.

It is with respect to these considerations and others that the present invention is described.

SUMMARY OF THE INVENTION

In accordance with the present invention, the above and other problems are solved by a method and system for providing a multiple line long distance discount feature. Call detail records for calls on a per call basis both in the wireline local and long distance setting and any wireless setting are assembled at a telecommunications service provider billing system for preparation of periodic billing to a subscriber. A discount feature engine reviews a periodic billing record for a billing telephone number and calculates the long distance charges for each telephone line associated with the billing telephone number. The line with the highest long distance charges is removed from consideration. The long distance charges for one or more of the remaining telephone lines is reduced by a predetermined amount. The reduced long distance charges are saved in a new periodic billing record associated with the billing telephone number. Thus, an incentive is provided for a customer to maintain his long distance service for more than one of his telephone lines with a single service provider because he will receive a discount for at least one of his lines if he does so.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

In accordance with an exemplary embodiment of the present invention a method and system for providing a multiple line long distance discount feature is described. Call detail records for calls on a per call basis both in the wireline local and long distance setting and any wireless setting are assembled at a telecommunications service provider billing system for preparation of periodic billing to a subscriber. A discount feature engine reviews a periodic billing record for a billing telephone number and calculates the long distance charges for each telephone line associated with the billing telephone number. The line with the highest long distance charges is removed from consideration. The long distance charges for one or more of the remaining telephone lines are discounted. The reduced long distance charges are saved in a new periodic billing record associated with the billing telephone number. Thus, in this embodiment, the present invention provides an incentive for a customer to maintain his long distance service for more than one of his telephone lines with a single service provider because he will receive a discount for at least one of his lines if he does so.

The present invention is advantageous in enhancing customer service and increasing customer loyalty to telecommunications service providers. For example, good will is established with a customer who is receiving a discount and the customer will be less likely to change long distance service providers.

EXEMPLARY OPERATING ENVIRONMENT

Figure 1:
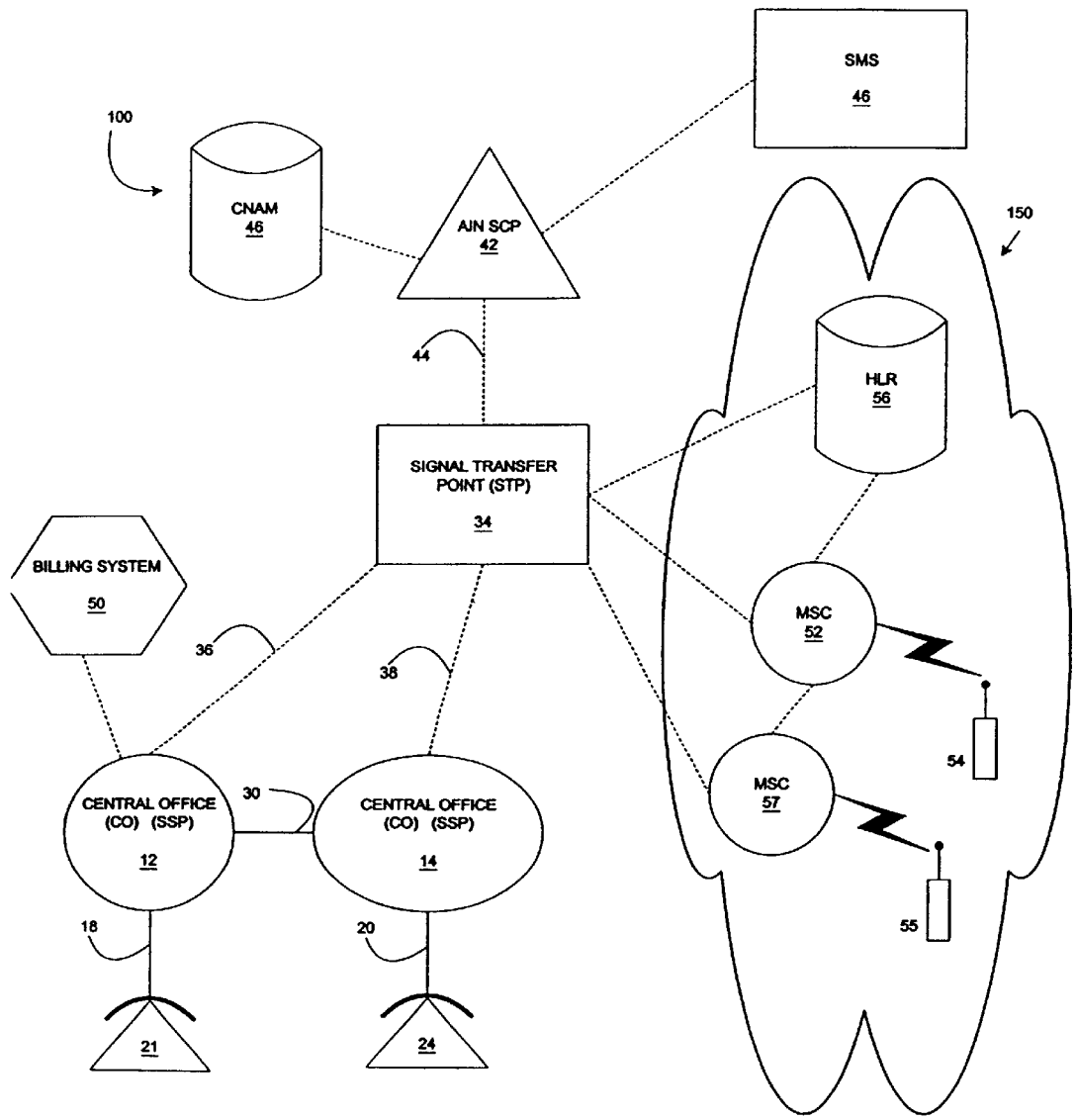
FIG. 1 is a block diagram illustrating components of a wireline and wireless telephone network that provides an exemplary operating environment for the present invention.

FIG. 1 is a block diagram illustrating components of a wireline and wireless telephone network that provides an exemplary operating environment for the present invention. Referring now to the drawings, in which like numerals represent like elements throughout the several figures, aspects of the present invention, the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuit 30.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence and the basis for many of the enhanced features of the network reside in the local AIN service control point (SCP) 42 that is connected to signal transfer point 34 via SS7 data link 44. As is known to those skilled in the art, relatively powerful fault tolerant computers physically implement AIN service control points, such as AIN SCP 42. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36 and 38. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The AIN SCP 42 is also connected to a caller ID with name (CNAM) database 46. The CNAM database comprises a plurality of directory numbers along with associated names for the directory numbers. The CNAM database may be used to provide a look-up database to provide caller ID service. The CNAM database may comprise directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

For preparation of billing information, the subscriber's telecommunications service provider is generally responsible for maintaining records for both local and long distance wireline and wireless services and producing billing statements for individual subscribers. The billing system 50, otherwise known as a call accounting system, includes computer systems, memory storage, software, and some mechanical methods for connection to the telephone network described with respect to FIG. 1. A billing system 50 is used to record information about the telephone calls, organize that information, and upon being asked, prepare statements related to subscriber use of telephone services. The information recorded or captured about telephone calls includes all information required to prepare periodic billing statements to subscribers for use of telephone services. Representative information includes type, date, time, duration, originating point and terminating point for telephone calls combined with subscriber information such as calling plan information, discounts provided to a subscriber, and the like.

The billing system 50 produces these billing statements, which are typically mailed to subscribers on a periodic basis. Information may be downloaded from the SSP 12 to the billing system 50 in association with the preparation of the billing statements. The operation of a billing system of a telecommunications service provider, such as the billing system 50, is well-known to those skilled in the art.

It will be appreciated that the billing system 50 may prepare records for each subscriber on a per communication basis. The originating switch that serves the subscriber's line typically creates these per communication records for a particular subscriber. Preferably, the AIN central office switches, such as SSPs 12, 14 create call detail records (CDR) that contain information on outgoing and incoming phone calls, including originating and terminating parties, originating and terminating destination, time of day, day of the week, duration of the call, type of call (wireline or wireless), and the like. Additionally, the call detail records typically contain call disposition information (e.g. answered, busy, etc.). The per communication call detail records created by the SSP 12 for the subscriber line 18 are periodically downloaded to the billing system 50 on a non-real time basis. The billing system 50 computes the costs for the communications represented by the various records and prepares billing statements to be mailed to the subscribers.

The wireless network 150, such as a cellular network, comprises a mobile switching center (MSC) 52, 57. The MSC 52 is a switch providing services and coordination between wireless users in network 50 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR). The call detail records created by the MSCs are transmitted to the billing system 50 for preparation of periodic wireless subscriber billing.

The MSC 52 may also be connected to a home location register (HLR) 56. The HLR is an SS7 database used to identify/verify a wireless subscriber. The HLR also comprises data related to features and services subscribed to by the wireless subscriber. The HLR is also used during roaming to verify the legitimacy of the subscriber and to provide him with his subscribed features. The HLR 56 may also be connected to the STP 34 and/or SCP 42 of the wireline network.

Figure 2:
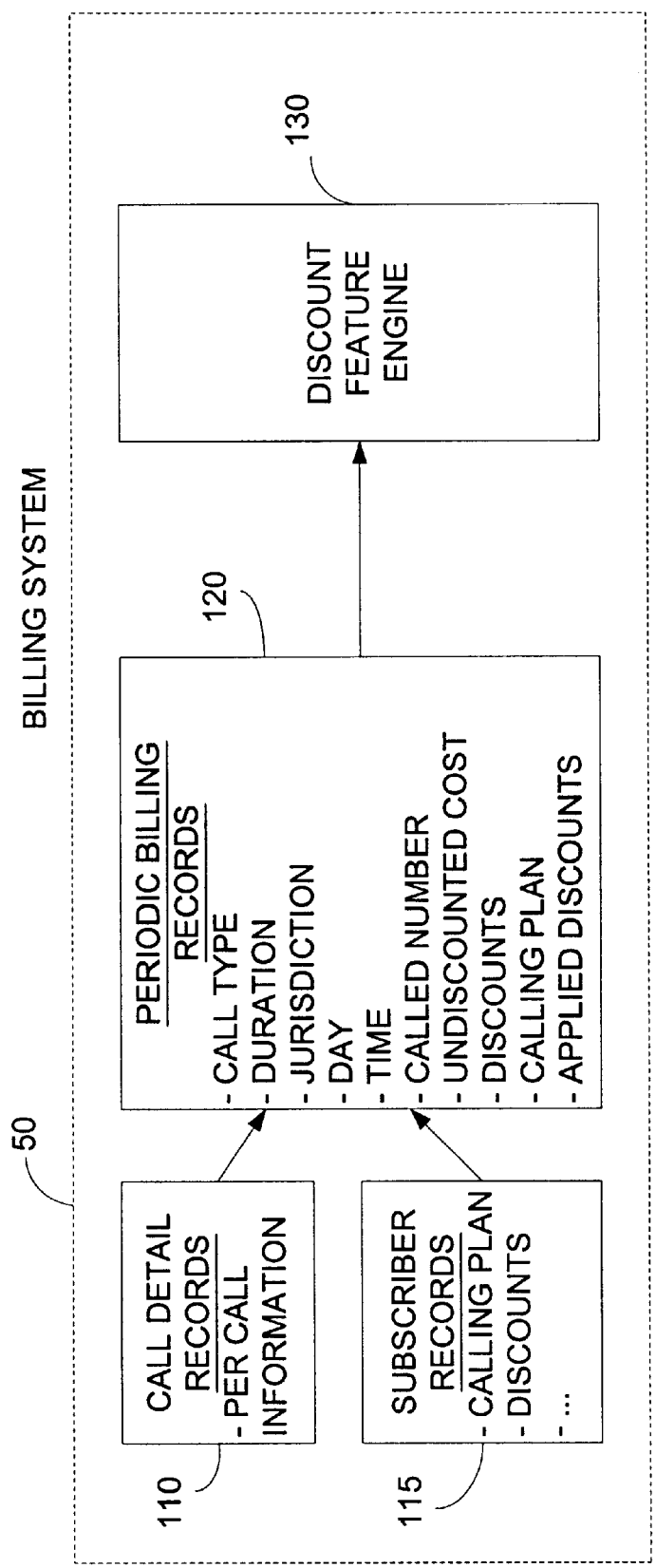
FIG. 2 is a block diagram illustrating the system architecture of an exemplary embodiment of the present invention.

FIG. 2 is a block diagram illustrating the system architecture of an exemplary embodiment of the present invention. As shown in FIG. 2, a call detail record 110 and a subscriber record 115 are utilized in the billing system 50 for creating a periodic billing record 120. The call detail records may contain per call information received from the switch 12 each time a subscriber utilizes the telephone services from her telephone 21, as illustrated in FIG. 1. Alternatively, where the subscriber is utilizing wireline services from a wireline telephone set 55, the call detail record may be generated at the MSC 57 and transmitted to the billing system 50. The subscriber record 115 contains information related to the subscriber's telecommunications service plan including the particulars of any calling plans utilized by the subscriber, any discounts provided to the subscriber (not including those provided by the present invention), and the like.

As is well known to those skilled in the art, on a periodic basis, for example, monthly, the billing system 50 generates a periodic billing record 120 for the preparation of billing to forward to the subscriber for use of the prescribed telecommunications services. Typically, a periodic billing record 120 contains information including the call type, the duration of the call, the jurisdiction of the call, the day and time of the call, the originating number and the called number, the undiscounted cost, any discounts, calling plan and other subscriber information, and any applied discounts. It should be understood, that the periodic billing record 120 may contain other information that is necessary to prepare bills to subscribers for their use of telecommunications services. The jurisdiction of the call includes information regarding the originating point and the terminating point of calls made by the subscriber. The call type may include information, including wireline long distance services, wireless services, calling card calls, assisted calls, etc.

The discount feature engine 130 is a software module containing instructions executable by a computer or other electronic device suitable for analyzing information from the periodic billing record 120. In accordance with an exemplary embodiment of the present invention, the discount feature engine 130 extracts information from the periodic billing record 120 and calculates the total cost associated with each line associated with a subscriber's billing telephone number (BTN), or billing account number (BAN). The discount feature engine then provides a discount to one or more of the lines associated with the billing telephone number or billing account number and saves a new periodic billing record. These discounts are typically in addition to any discounts already determined using the subscriber records 115.

Figure 3:
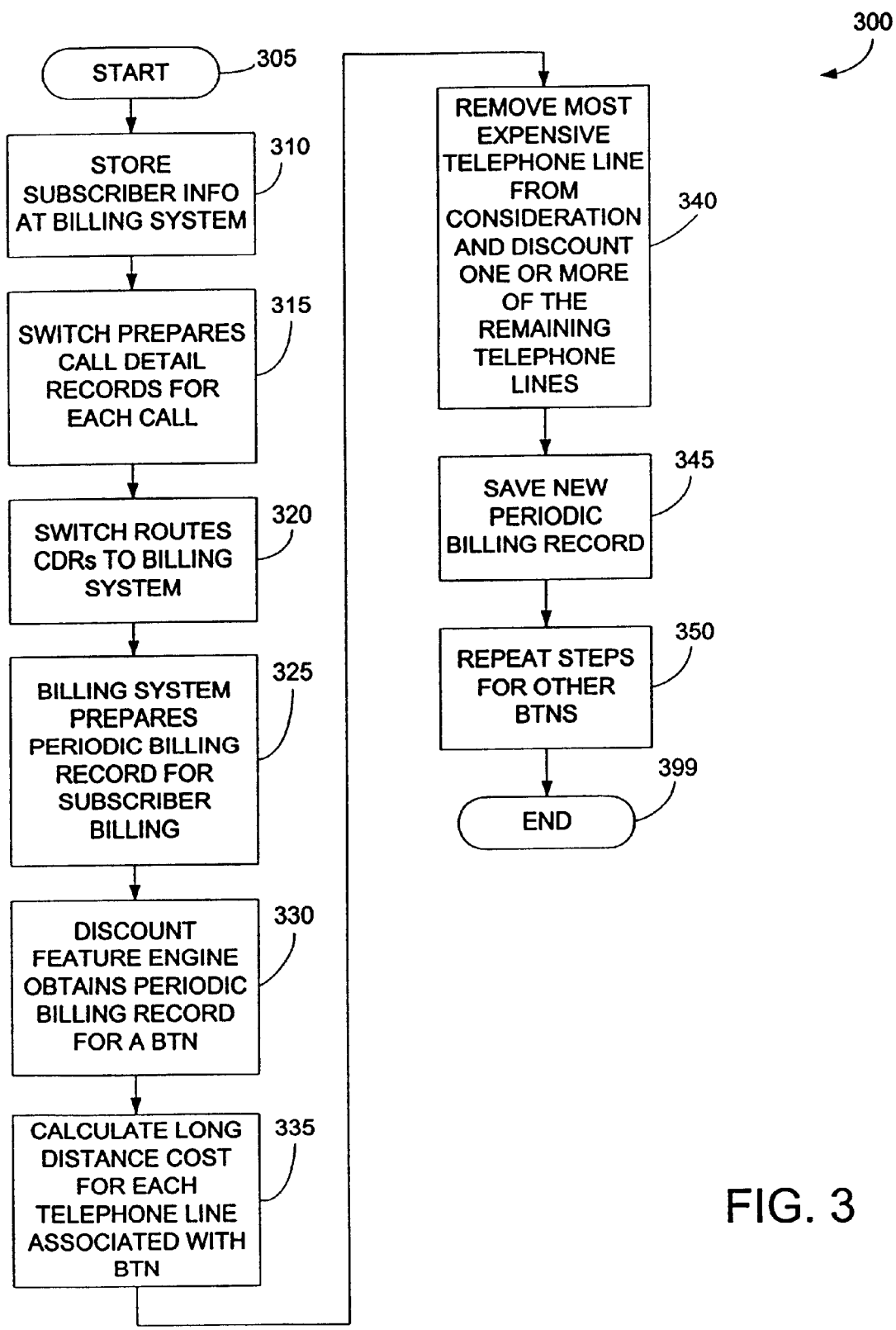
FIG. 3 illustrates an operational flow of the steps performed in providing a multiple line long distance discount feature in accordance with an embodiment of the present invention.

Having described an exemplary operating environment and the system architecture for the present invention with reference to FIGS. 1 and 2, a flow diagram illustrating a method 300 for providing a multiple line long distance discount feature is described in reference to FIG. 3.

The method 300 begins at step 305 and moves to step 310 where information on the subscriber (customer) such as the subscriber's billing plan and any discounts or special services provided to the subscriber are stored in the subscriber records 115 of the billing system 50. At step 315, the switch 12 to which the subscriber's telephone 21 is functionally connected, as described above, prepares call detail records for each call made by the subscriber. As should be understood, a call detail record is made for each call whether the call is a local wireline or long distance wireline call, or whether the call is a wireless call made from a wireless handset 54 through an MSC 52, as described with reference to FIG. 1.

At step 320, the switch 12 routes the call detail records to the billing system 50 for subsequent preparation of periodic billing records and bills to be forwarded to the subscriber for the subscriber's use of the telecommunications services. At step 325, the billing system 50 prepares the periodic billing record 120, as described above. At step 330, the discount feature engine 130 obtains a periodic billing record 120 for the subscriber's billing telephone number (BTN). A BTN is the primary telephone number used for billing regardless of the number of telephone lines associated with the number. Multiple working telephone numbers (WTNs), or working telephone lines, can be associated with a single BTN. Typically, the BTN is a seven digit number with the area code followed by the alphanumeric code assigned by the local telephone company (e.g. NPA-NXX-XXXX). The BTN may also be referred to herein as the billing account number (BAN).

At step 335, the long distance charges for each of the telephone lines, or WTNs, associated with the BTN are determined from the periodic billing record.

At step 340, the telephone line, or WTN, with the most expensive long distance charges is discarded from consideration and the long distance charges for one or more of the remaining telephone lines is discounted by a predetermined amount. For example, suppose a BTN has three numbers associated with it 555-555-1111, 555-555-2222 and 555-555-3333 with long distance charges of ten dollars, twenty dollars and thirty dollars respectively. In a preferred embodiment of the invention, the telephone line 555-555-3333 will not be discounted because it has the highest long distance charges; the telephone lines 555-555-1111 and 555-555-2222 will be discounted by a predetermined amount, such as five percent. Thus, the long distance charge for line 555-555-1111 will be $9.50 (rather than ten dollars) and the long distance charge for 555-555-2222 will be nineteen dollars (rather than twenty dollars). Typically, the discounts applied at step 340 will be in addition to any discounts already provided in the customer's regular calling plan (see subscriber records 115). So, the customer is receiving additional cost savings and the service provider maintains good will with the customer.

At step 345, the new periodic billing record is saved, including any discounts computed at step 340. In a preferred embodiment, the original long distance bill and the discounted long distance charges are both saved so that the bill sent to the customer shows the customer's added savings for maintaining multiple lines with the same service provider.

At step 350, steps 330–345 are repeated for each BTN in the billing system 50 and then the method ends at step 399.

It should be understood that the present invention provides a customer with a discount for each additional telephone line associated with a main billing number or main account number. This discount provides an incentive to the customer to maintain as many telephone lines as possible with the long distance service provider.

It should be understood from the foregoing description that the invention, in one embodiment, analyzes long distance usage at the line level. Customer long distance usage at the end of the billing cycle is determined for each line (telephone number) associated with the main billing number (account number). The line(s) with the least amount of long distance usage (costwise) is discounted an amount in addition to the normal or existing calling plan discounts to the primary or the line with the highest long distance usage. This rating process requires the billing system to monitor usage on a per line basis and then, at the end of the customer's billing cycle, compare the total long distance charges between all the lines associated with the main billing number. The lines with the least amount of usage (costwise) during the billing cycle receive an additional discount over the rates applied on the line with the highest amount of usage.

In one embodiment of the invention, the discount applied is a predetermined percentage, such as five percent. In other embodiments, the discount may be an incremental amount that increases depending on the number of lines a customer has with the long distance service provider, depending on the amount of long distance charges, etc. For example, if a customer has two lines the discount may be five percent, three lines, six percent, etc. As another example, the discount may be five percent for the second line, six percent for the third line, etc. As another example, the discount may be five percent for charges between zero and fifty dollars, six percent for charges between fifty-one and one hundred dollars, etc. Those skilled in the art will understand that the discount may take many different forms.

It should be understood that, in a preferred embodiment, the line with the highest long distance charges is not discounted. However, in alternative embodiments of the invention, the line with the highest long distance charges may be discounted and could, in fact, be the only line discounted. Also, in alternative embodiments, the present invention may be used with wireless telephones that are associated with the same account number.

As described herein, a system and method are provided for a multiple line long distance discount feature. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. In a telecommunications environment, a computer-implemented method of providing a long distance discount feature, comprising the steps of:
   receiving a periodic billing record for a billing account number;
   calculating a long distance cost for each telephone line associated with the billing account number; and
   discounting the long distance cost for each telephone line except the telephone line with the largest long distance cost.

2. The method of claim 1 further comprising the step of saving the discounted long distance cost for each telephone line in an updated periodic billing record.

3. The method of claim 2 further comprising repeating the receiving, calculating, discounting and saving steps for each billing account number in a billing system of telecommunications environment.

4. The method of claim 1 wherein the telecommunications environment is a wireline network.

5. The method of claim 1 wherein the telecommunications environment is a wireless network.

6. The method of claim 1 wherein the step of discounting the long distance cost for each telephone line except the telephone line with the largest long distance cost comprises providing a predetermined percentage discount to each telephone line.

7. The method of claim 6 wherein the predetermined percentage discount is based on the number of telephone lines associated with the billing account number.

8. The method of claim 6 wherein the predetermined percentage discount is based on the long distance cost for each telephone line.

9. A system for providing a long distance discount to a multiple subscriber in telecommunications network, the system comprising:
   a plurality of call detail records comprising per call information for a plurality of telephone lines wherein the plurality of telephone lines are associated with a billing account number;
   a subscriber record comprising a calling plan, wherein the calling plan describes the rate to be applied to long distance calls placed on the plurality of telephone lines;
   a periodic billing record, wherein the periodic billing record is generated using the plurality of call detail records and the subscriber record and wherein the periodic billing record comprises long distance charges for each of the plurality of telephone lines; and
   a discount feature engine, wherein the discount feature engine calculates which of the plurality of telephone lines has the largest long distance charges and wherein the discount feature engine discounts the long distance charges for at least one of the telephone lines that is not the one with the largest long distance charges.

10. The system of claim 9 wherein the discount is a predetermined percentage that is applied to each of the long distance charges for each of the telephone lines except the telephone line with the largest long distance charges.

11. The system of claim 9 wherein the telecommunications network is a wireless network.

12. In a telecommunications environment, a computer-implemented method of providing a long distance discount feature, comprising the steps of:
   receiving a periodic billing record for a billing account number;
   calculating a long distance cost for each telephone line associated with the billing account number; and
   discounting the long distance cost only for the telephone line with the least long distance cost.

13. The method of claim 12, further comprising the step of saving the discounted long distance cost for the telephone line in an updated periodic billing record.

14. The method of claim 13, further comprising repeating the receiving, calculating, discounting and saving steps for each billing account number in a billing system of the telecommunications environment.

15. The method of claim 12, wherein the telecommunications environment is a wireline network.

16. The method of claim 12, wherein the telecommunications environment is a wireless network.

17. The method of claim 12, wherein the step of discounting only the telephone line with the lowest long distance cost comprises providing a predetermined percentage discount to that telephone line.

18. The method of claim 17, wherein the predetermined percentage discount is based on the number of telephone lines associated with the billing account number.

19. The method of claim 17, wherein the predetermined percentage discount is based on the long distance cost for each telephone line.

\* \* \* \* \*